United States Patent [19]

Salvia

[11] Patent Number: 4,562,457
[45] Date of Patent: Dec. 31, 1985

[54] SYNC GENERATOR, VIDEO PROCESSOR

[75] Inventor: Frank Salvia, Old Bethpage, N.Y.

[73] Assignee: Grumman Aerospace Corporation, Bethpage, N.Y.

[21] Appl. No.: 452,809

[22] Filed: Dec. 23, 1982

[51] Int. Cl.$^4$ .................. H04N 9/45; H04N 9/455
[52] U.S. Cl. ................................ 358/19; 358/17
[58] Field of Search ................................ 358/17, 19

[56]  References Cited
U.S. PATENT DOCUMENTS

| 2,735,886 | 2/1956 | Schlesinger . |
| 2,910,581 | 10/1959 | Richman . |
| 2,930,842 | 3/1960 | Leyton . |
| 3,507,983 | 4/1970 | Leman . |
| 3,549,793 | 12/1970 | Ross . |
| 4,018,990 | 4/1977 | Long et al. . |
| 4,024,571 | 5/1977 | Dischert et al. . |
| 4,052,733 | 10/1977 | Derenbecher, Jr. . |
| 4,054,904 | 10/1977 | Saitoh et al. . |
| 4,072,983 | 2/1978 | Aschwanden . |
| 4,122,488 | 10/1978 | Mikado . |
| 4,203,135 | 5/1980 | Saski . |
| 4,333,103 | 6/1982 | Kiowa et al. . |
| 4,454,530 | 6/1984 | Yoshinaka et al. ............... 358/19 |

Primary Examiner—Richard Murray
Attorney, Agent, or Firm—Richard G. Geib; Daniel J. Tick; Bernard S. Hoffman

[57]  ABSTRACT

A single compact multi-function video processing unit of a color video system has a sync generator for driving a video source and a video processor for providing video functions. A bus system interconnects the sync generator and video processor.

12 Claims, 11 Drawing Figures

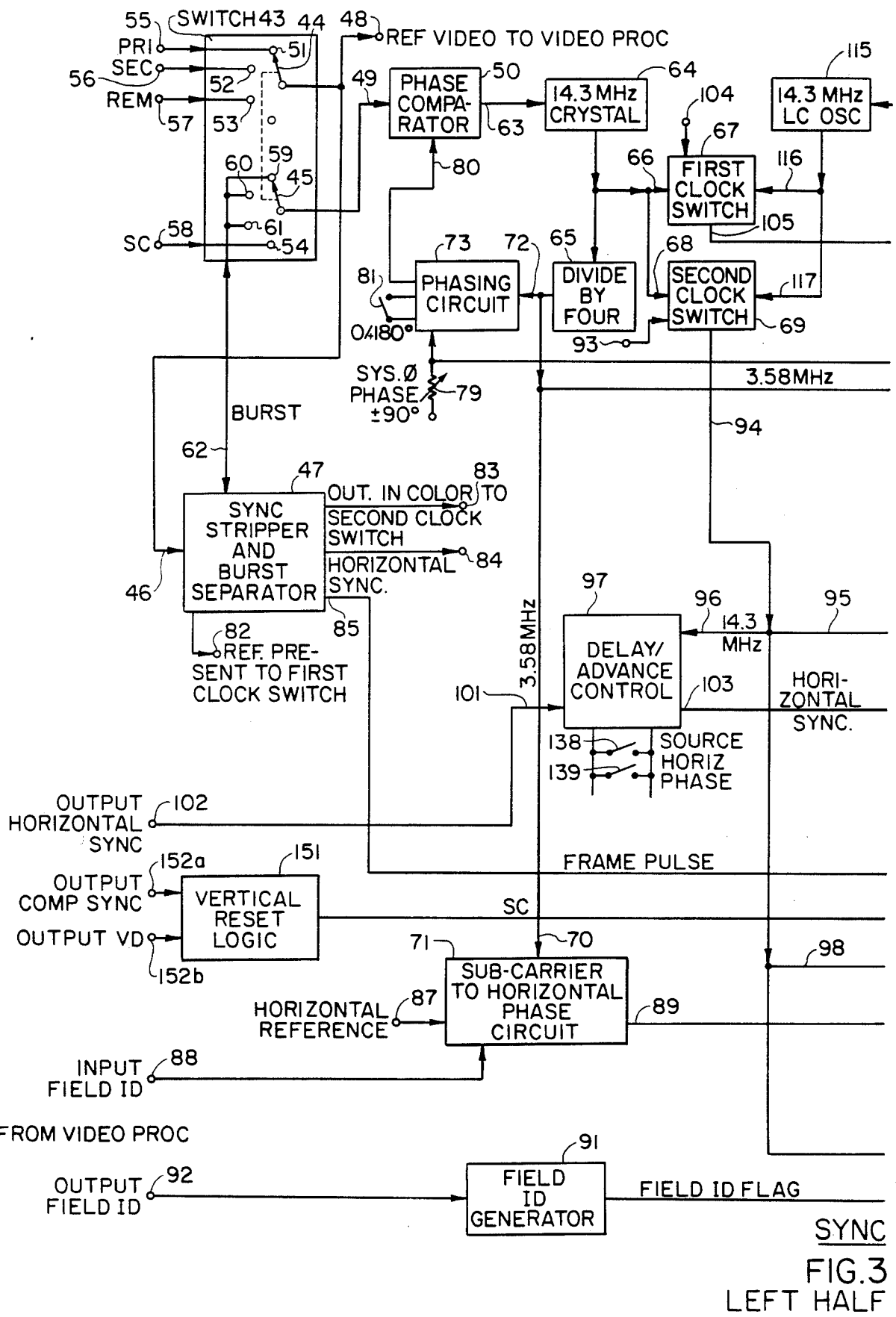
FIG. 3 LEFT HALF
SYNC

GENERATOR

RIGHT HALF

AUTOMATIC SUB-CARRIER TO HORIZONTAL PHASE CIRCUIT

FIELD ID DETECTOR AND GENERATOR

BLANKING WIDTH VERIFIER

HORIZONTAL BLANKING WIDTH MARKERS

SYNC GENERATOR, VIDEO PROCESSOR

BACKGROUND OF THE INVENTION

The present invention relates to a sync generator, video processor. More particularly, the invention relates to a sync generator, video processor of a color video system.

In television apparatus, and especially in apparatus for processing color video signals in the National Television Standards Committee (NTSC), video processor amplifiers are used to provide various processing functions to the video signal. Thus, the video processor amplifiers function to reinsert sync, blanking and burst signals and to provide control of the video signal components such as video level, setup level, sync level, burst level, chroma level and burst phase.

Another parameter which is very important with regard to color phase matching and/or color frame recording is the phase relationship which exists between the leading edge of the horizontal sync pulse and the zero crossover of the sub-carrier to horizontal (SCH) phase. This parameter is critical when the video signal is to be color phase matched to another signal or when the signal is to be recorded for editing at a later time. Problems arise if the SCH of the two signals is not identical, when an attempt is made to color phase match video signals. Horizontal shifts may occur under this condition.

Another problem is the setting of the correct SCH on a composite video signal. There are two possible correct settings for the SCH. This is because the SCH is set without knowing which field is being observed. The setting of the SCH then defines the field sequence. What should be done is to first define the field sequence and then set the SCH. This eliminates the ambiguity in correctly setting the SCH.

Still another problem is the maintaining of the correct SCH in the output video with different SCH input reference signals. Known circuits solve only half the problem, since, although they do maintain the output SCH, they also interchange the field sequence while maintaining it. Thus, for example, 1-2-3-4 becomes 3-4-1-2. This is due to the fact that the horizontal (H) sync is clocked by two times the sub-carrier, resulting in the H sync being clocked in steps of one half cycle of the sub-carrier, or 140 nanoseconds.

The principal object of the invention is to provide a sync generator, video processor which enables the SCH to be correctly set.

An object of the invention is to provide a sync generator, video processor which provides positive identification of the four field color sequence, thereby enabling the correct setting of the SCH.

Another object of the invention is to provide a sync generator, video processor which automatically maintains the setting of the SCH after it has been correctly set, regardless of different input SCH references.

Still another object of the invention is to provide a sync generator, video processor which provides a reference for outside systems by encoding the field identification (ID) on the output video.

Yet another object of the invention is to provide a sync generator, video processor which functions as full sync generator capable of driving any video source.

An object of the invention is to provide a sync generator, video processor which functions as a blanking width verification (BWV) circuit.

Another object of the invention is to provide a sync generator, video processor which functions as a video source identification (VSID) circuit.

Still another object of the invention is to provide a sync generator, video processor which functions as a vertical interval test signal (VITS) inserter.

An object of the invention is to provide a sync generator, video processor which functions as a digital remote control.

Another object of the invention is to provide a sync generator, video processor which functions as a vertical interval reference signal (VIRS) inserter.

Still another object of the invention is to provide a sync generator, video processor which provides multifunction video signal processing, including color field identification, automatic setting of the SCH, and BWV.

Yet another object of the invention is to provide a sync generator, video processor which significantly reduces video tape or match frame editing time and studio setup time.

An object of the invention is to provide a sync generator, video processor which is economical in operation and is a single compact unit for multi-function video processing.

BRIEF SUMMARY OF THE INVENTION

In accordance with the invention, a sync generator video processor of a color video system comprises a single compact multi-function video processing unit including a sync generator for driving a video source, a video processor for providing video functions and a bus system interconnecting the sync generator and the video processor.

The sync generator includes horizontal and sub-carrier phasing control means. The video processor includes color field identification, blanking width verification and output equalization. A power supply, a front panel control and a rear panel are provided. The bus system includes a power bus connecting the power supply to the sync generator and to the video processor, a control bus connecting the sync generator and the video processor to the front panel control, an input/output bus connecting the sync generator and the video processor to the rear panel and an interconnect bus interconnecting the sync generator and the video processor.

The video processor includes an input for receiving a video reference and a field identification detector and a field identification generator for detecting the presence of an input color field identification on the incoming video reference. The color field identification is a color burst of a predetermined frequency occurring during the vertical interval and preceding a horizontal sync pulse of line 10 on fields 2 and 3 only. The field identification detector informs the field identification generator to output a field identification on the output video on fields 2 and 3, and generates a field identification based on the relative phase between the horizontal sync and a sub-carrier in the absence of a field identification. The field identification positively identifying the four fields and setting the correct sub-carrier to horizontal phase.

The video processor includes a blanking width verifier for providing a rapid and efficient means for determining and measuring if horizontal and vertical blanking is within tolerance. The blanking width verifier comprises a horizontal pulse generator for generating pulses which indicate the permissible horizontal blanking. The horizontal pulse generator has a horizontal sync first input, a second input and first and second outputs. A vertical pulse generator generates pulses which indicate the permissible vertical blanking and has a vertical sync first input, a second input and first and second outputs. The first output of the horizontal pulse generator is connected to the second input of the vertical pulse generator. The first output of the vertical pulse generator is connected to the second input of the horizontal pulse generator. A pulse shaper is connected to the second outputs of the horizontal pulse and vertical pulse generators via a gate and provides blanking width verified video signals.

The sync generator, video processor further includes an option board having a video source identification circuit for generating characters in the video to provide a source identification. A vertical interval test signal/-vertical interval reference signal generator generates the vertical interval test and vertical interval reference signals, inserted during black intervals. A digital remote circuit enables the use of switches for logic control on the board. The power bus connects the power supply to the option board. The control bus connects the option bocrd to the front panel control. The input/output bus connects the option board to the rear panel and the interconnect bus interconnects the sync generator, video processor and option board.

The said sync generator has a plurality of reference inputs for feeding primary signals, secondary signals and a sub-carrier to the sync generator, source horizontal phase control means, output horizontal phase control means, system phase control means, output sub-carrier phase control means and source sub-carrier control means, and a plurality of outputs for feeding a composite sync, a composite blanking signal, a burst flag drive signal, a horizontal drive signal, a vertical drive signal, a source/burst signal, a field identification signal and a sub-carrier to a local video source.

The field identification detector comprises a sync stripper for receiving the video reference. A bandpass filter passes the predetermined frequency and extracts the chrominance information from the incoming video. The bandpass filter has an input connected with the sync stripper in common to the input for receiving the video reference. A gate has first and second inputs and an output. A window generator has an input connected to the sync stripper and an output connected to the first input of the gate and supplies a switch signal thereto for selectively turning the gate ON and OFF. The filter has an output connected to the second input of the gate. The output of the gate contains only field identification information. A counter and reset pulse generator connected to the output of the gate provides reset pulses.

The video processor has an input for feeding it video from a local video source, a plurality of inputs connected to corresponding outputs of the sync generator for receiving horizontal reset, vertical reset and clock pulses from the sync generator, video level control means, setup level control means, burst level control means, sync level control means and chroma level control means, a plurality of video outputs, and a pair of outputs for feeding a sync signal and a sub-carrier to the option board.

The sync generator includes a sub-carrier to horizontal phase circuit for maintaining the sub-carrier to horizontal phase automatically, regardless of input. The sub-carrier to horizontal phase circuit has an input providing a horizontal sync and inputs providing a subcarrier thereto and clocking half the horizontal sync with the sub-carrier in order to track the sync with the sub-carrier thereby preventing an interchange of fields.

The field identification generator has internal and external modes of operation and comprises a control logic circuit connected to the counter and reset pulse generator of the field identification detector whereby the control logic circuit receives the reset pulses thereby enabling the output field identification to be in step with the input field identification. A sync/sub-carrier phase detector is connected to the control logic circuit and receives an output sync and an output sub-carrier from the video processor. The phase detector determines the relative phase between the output sync and output sub-carrier. A burst gate generator is connected to the phase detector and generates the field identification in proper fields based upon the relative phase between the output sync and output sub-carrier, in the internal mode of operation of the field identification generator.

The sub-carrier to horizontal phase circuit of the sync generator further includes hysteresis adding means for adding a specific amount of hysteresis in order to prevent output horizontal jitter resulting from the leading edge of the horizontal sync being in time coincidence with the leading edge of the sub-carrier. The hysteresis adding means prevents the leading edge of the sync from being in time coincidence with the leading edge of the sub-carrier.

In the external mode of operation of the field identification generator, the control logic circuit determines, via the phase detector, in which fields the field identification burst will be added.

The sub-carrier to horizontal phase circuit of the sync generator further includes an input delay and switch means for sensing the phase differential between half the horizontal sync and the sub-carrier, and switches the input delay of the horizontal sync ON and OFF in accordance with the phase differential.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
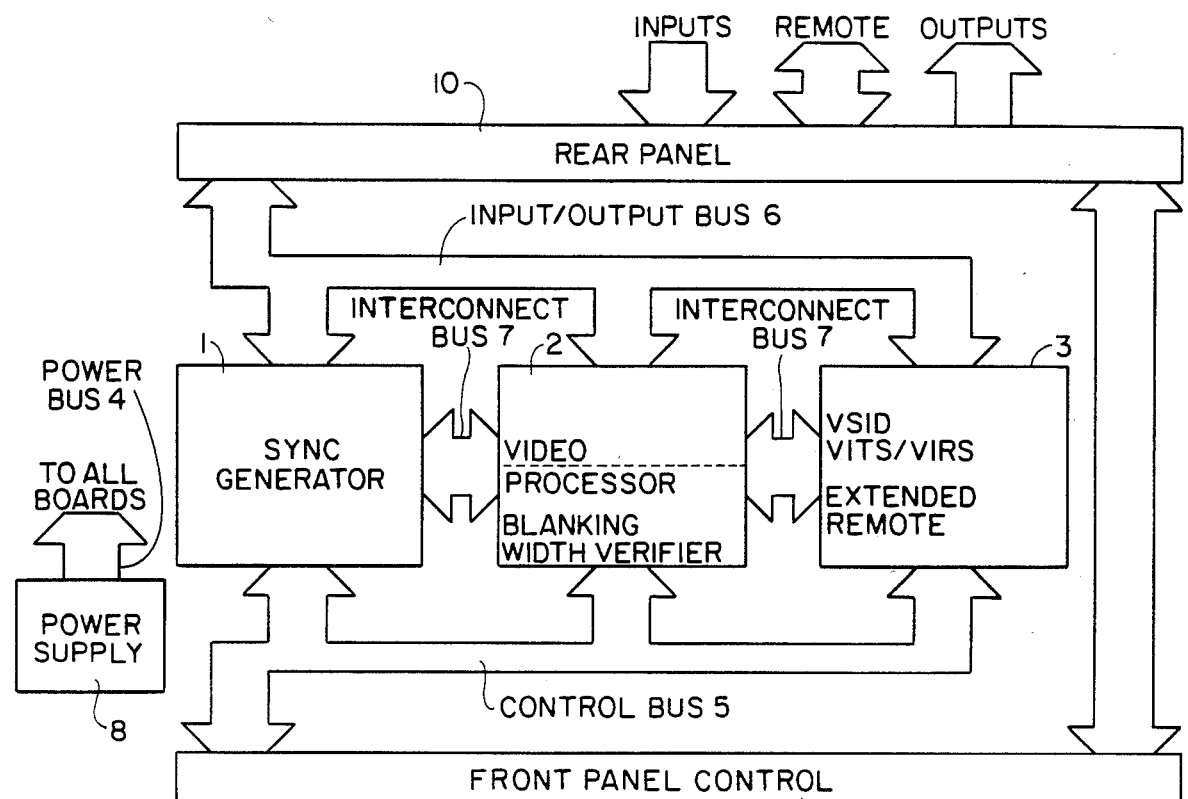
FIG. 1 is a block diagram of an embodiment of the sync generator, video processor of the invention.

The sync generator, video processor of the invention comprises three printed circuit boards 1, 2 and 3 mounted in a standard rack mount chassis (FIG. 1). The circuits of the circuit boards 1, 2 and 3 are known in the art and commercially available, except for the exceptions hereinafter described. The circuit board 1 is a sync generator, the circuit board 2 is a video processor and the circuit board 3 is an option board and may include a video source identification (VSID) circuit for generating characters in the video to provide a source identification (ID), a vertical interval test signal/vertical interval reference signal (VITS/VIRS) generator for generating the vertical interval test and vertical interval reference signals, inserted during blank intervals, and a digital remote circuit which enables the use of switches rather than the front panel potentiometers to control the logic on the board.

In accordance with the invention, the sync generator 1, video processor 2 and VSID, VITS/VIRS and remote control 3 circuits are interconnected by a bus system, as shown in FIG. 1, which permits any of the boards 1, 2 and 3 to be plugged into any slot. The bus system includes a power bus 4, a control bus 5, an input/output (I/O) bus 6 and an interconnect bus 7 (FIG. 1). The power bus 4 connects a power supply 8 of any suitable known type to the circuit boards 1, 2 and 3. The control bus 5 connects the circuit boards 1, 2 and 3 to a front panel 9. The I/O bus 6 connects the circuit boards 1, 2 and 3 to a rear panel 10. The interconnect bus 7 interconnects the panels 1 and 2 and 2 and 3.

The front panel 9 is hingedly affixed to the chassis by scissors type hinge arrangement (not shown in the FIGS.) which permits the removal of all the circuit boards 1, 2 and 3 through the front.

The sync generator, video processor of the invention includes the full master/slave sync generator 1 with color field identification capable of driving any video source such as, for example, a TV camera, a telecine, a videotape recorder, etc. The sync generator 1 has all the necessary phasing controls, including the horizontal phase, the sub-carrier phase, etc. The inclusion of the sync generator 1 in the same package as the video processor 2 provides the advantage of more complete control of the source video from the same physical location. The video processor 2 provides all the standard video functions plus color field identification, blanking width verification (BWV) and output equalization. The digital remote control of the third panel 3 is for the front panel 9 and phase controls.

Figure 2:
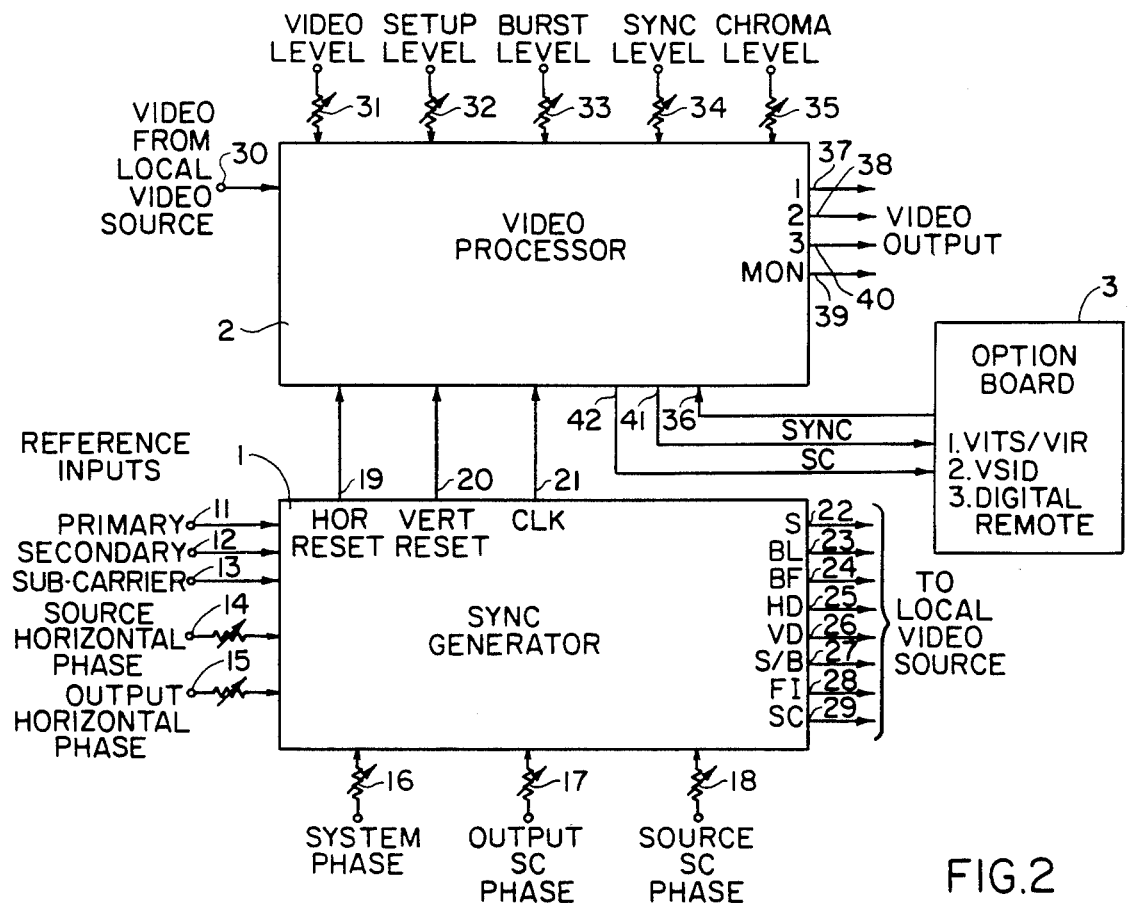
FIG. 2 is a functional block diagram of the embodiment of FIG. 1.

The sync, or master synchronizing, generator 1 has a plurality of reference inputs 11, 12, 13, 14, 15, 16, 17 and 18, as shown in FIG. 2. The primary signals are fed to the input 11, the secondary signals are fed to the input 12 and the sub-carrier (SC) is fed to the input 13. The source horizontal phase is controlled by a variable resistor 14. The output horizontal phase is controlled by a variable resistor 15. The system phase is controlled by a variable resistor 16. The output sub-carrier phase controlled by a variable resistor 17 and the source sub-carrier phase is controlled by a variable resistor 18.

As shown in FIG. 2, the sync generator 1 has a plurality of outputs 19, 20 and 21 connected to corresponding inputs of the video processing amplifier, or video processor 2. The sync generator 1 feeds the horizontal reset to the video processor 2 via the output 19, feeds the vertical reset to said video processor via the output 20 and the clock pulses to said video processor via the output 21. The sync generator 1 has an additional plurality of outputs 22, 23, 24, 25, 26, 27, 28 and 29 connected to a local video source (not shown in FIGS.). The sync generator 1 provides a composite sync (S) output at its output 22, a composite blanking (BL) output at its output 23, a burst flag drive (BF) output at its output 24, a horizontal drive (HD) signal output at its output 25, a vertical drive (VD) signal output at its output 26, a sync/burst (S/B) output at its output 27, a field identification (FI) output at its output 28 and a sub-carrier (SC) output at its output 29.

The video processor 2 has an input 30 which feeds video signals from the local video source (not shown in the FIGS.). The video level is controlled by a variable resistor 31. The setup level is controlled by a variable resistor 32. The burst level is controlled by a variable resistor 33. The sync level is controlled by a variable resistor 34. The chroma level is controlled by a variable resistor 35. The output of the board 3 is fed to the input 36 of the video processor 2.

As shown in FIG. 2, the video processor 2 has a plurality of video outputs 37, 38, 39 and 40, which provide output video and a pair of outputs 41 and 42 which supply the sync signals and sub-carrier, respectively, to the board 3.

Figure 3:
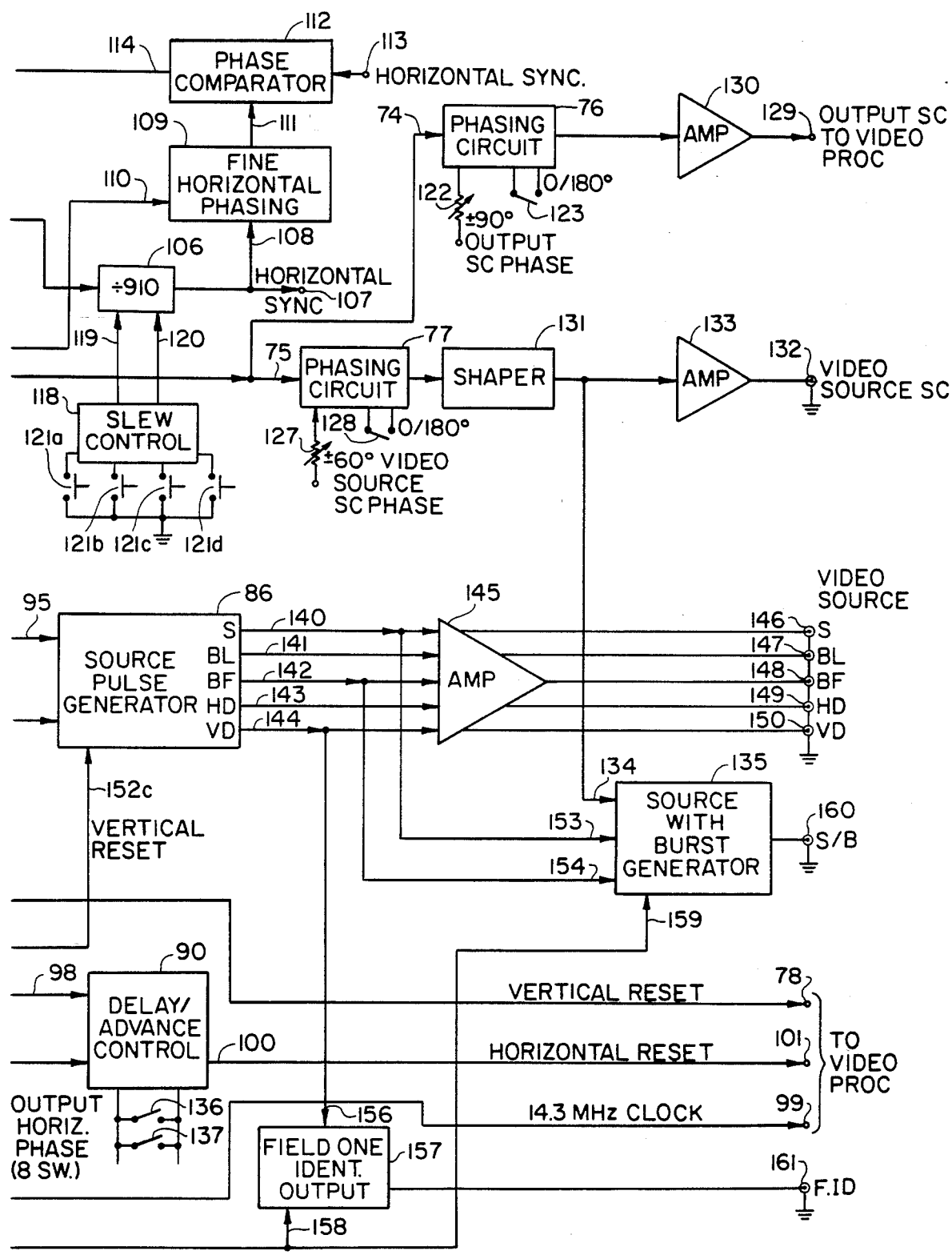
FIG. 3 is a block diagram of an embodiment of the sync generator of FIG. 1.

The sync generator, as shown in FIG. 3, comprises an input reference switch 43, which is an electronic switch connected to an input 46 of a sync stripper and burst separator 47 in common with an output 48, and to an input 49 of a phase comparator 50, respectively. A reference video signal to the video processor 2 is provided at the output 48. The switch 43 is connected to input terminals 55, 56, 57 and 58, which provide primary, secondary, video and sub-carrier signals, respectively, at said inputs. The switch 43 is also connected to an input 62 of the sync stripper and burst separator 47. The switch 43 selectively feeds a burst signal to the input 62 of the sync stripper and burst separator 47. Although the switch 43 is an electronic switch, it is schematically illustrated in FIG. 3 as mechanical to demonstrate its operation.

The phase comparator 50 has an output 63 connected to the input of a 14.3 mHz crystal 64. The crystal 64 has an output connected in common to the input of a divide-by-four circuit 65 and an input 66 of a first clock switch 67 and an input 68 of a second clock switch 69. The output of the divide-by-four circuit 65 is connected in common to an input 70 of a sub-carrier to horizontal phase clock circuit 71, an input 72 of a phasing circuit 73, and the inputs 74 and 75 of a pair of phasing circuits 76 and 77, respectively.

Figure 5:
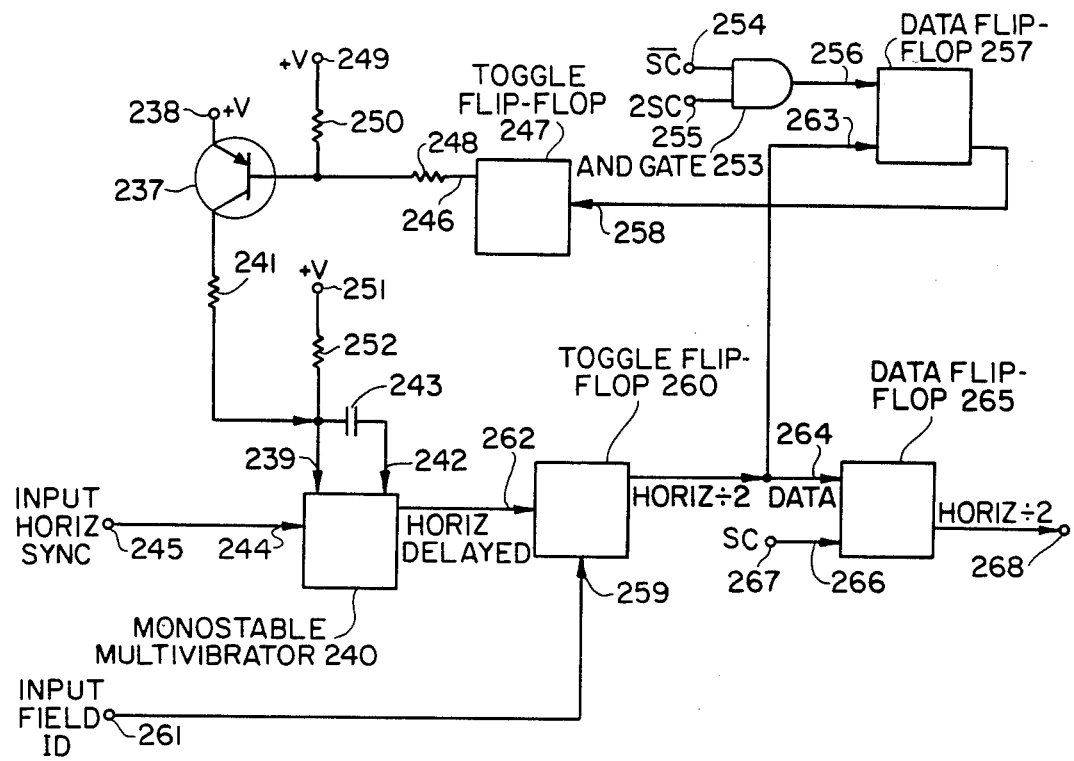
FIG. 5 is a block diagram of an embodiment of the automatic sub-carrier to horizontal phase circuit of FIG. 3.

The sync generator 1 comprises components and circuitry known in the art and commercially available, with the exception of the sub-carrier to horizontal phase circuit 71. The circuit 71 maintains the sub-carrier to horizontal phase, automatically, regardless of the input. The circuit 71 is shown in FIG. 5. The divide-by-four circuit 65 supplies a 3.58 mHz sub-carrier to the sub-carrier clock circuit 71 and to the phasing circuits 73, 76 and 77. The phasing circuit 73 is controlled in phase by a phase control variable resistor 79. The output of the phasing circuit 73 is connected to an input 80 of the phase comparator 50. The phasing circuit 73 has a switch 81 for changing the phase 180°.

The sync stripper and burst separator 47 has an output 82 at which it provides a switch signal which is pre-sent to the first clock switch 67, an output 83 at which it provides an output in color to the second clock switch 69 and an output 84 at which it provides a horizontal sync. The sync stripper and burst separator 47 also has an output 85 connected to an output terminal 78. A frame pulse is provided at the output 85 and the vertical reset pulse is provided at the output terminal 78. The sub-carrier to horizontal clock circuit 71 has an input 87 to which a horizontal reference signal is fed and an input 88 to which an input field identification signal from the video processor is fed. The subcarrier to horizontal clock circuit 71 also has an output 89 connected to an input of a delay/advance control circuit 90. A field identification generator 91 has an input 92 to which an output field identification signal from the video processor is fed.

The second clock switch 69 has a second input 93 which is the output in color switch signal from the sync stripper and burst separator 47. The second clock switch 69 has an output 94 connected in common to inputs 95 and 96 of a source pulse generator 86 and a delay/advance control circuit 97, respectively, an input 98 of the delay/advance control circuit 90 and an output terminal 99, at which it provides a 14.3 mHz clock signal (FIG. 3). The delay/advance control circuit 90 has an output 100 connected to an output terminal 101 and supplies a horizontal reset signal to said output terminal. An input terminal 102 is connected to the other input of the delay/advance control circuit 97 and supplies an output horizontal sync signal to said input. The delay/advance control circuit 97 has an output 103 connected to the third input of the source pulse generator 86 and supplies the horizontal sync signal to said generator via said output.

The first clock switch 67 has an input 104 which is connected to the output 82 of the sync stripper and burst separator 47 and receives a switch signal from said sync stripper and burst separator which tells the clock which input to select. The first clock switch 67 has an output 105 connected to an input of a divide-by-910 circuit 106. The divide-by-910 circuit 106 has an output connected in common to an output terminal 107 and an input 108 of a fine horizontal phasing circuit 109 and supplies the horizontal sync pulses to said terminal and said input. The input terminal 78 is connected to a second input 110 of the fine horizontal phasing circuit 109 via the variable resistor 79. The output of the fine phasing circuit 109 is connected to an input 111 of a phase comparator 112. The phase comparator 112 has a second input 113 via which the horizontal sync signals are fed to said phase comparator.

The phase comparator 112 has an output 114 connected to the input of 14.3 mHz LC oscillator 115. The oscillator 115 has an output connected in common to a third input 116 of the first clock switch 67 and a third input 117 of the second clock switch 69. A slew control circuit 118 is connected to second and third inputs 119 and 120 of the divide-by-910 circuit 106. The slew control circuit 118 has a plurality of switches 121a, 121b, 121c and 121d for UP, DOWN, LEFT and RIGHT connection to ground, respectively.

The phasing circuit 76 is controlled in phase via a variable resistor 122. A switch 123 connected in the phasing circuit 76 changes the phase thereof 180°. The phasing circuit 77 is controlled in phase via a variable resistor 127. A switch 128 connected in the phasing circuit 77 changes the phase thereof 180°. The phasing circuit 76 has an output connected to an output terminal 129 via an amplifier 130. The output sub-carrier is provided at the output terminal 129 and is fed to the video processor.

The phasing circuit 77 has an output connected to the input of a shaper circuit 131 and said shaper circuit has an output connected to an output terminal 132 via an amplifier 133 and directly to an input 134 of a sync with burst generator 135. The video source sub-carrier is provided at the output terminal 132. The delay/advance control circuit 90 has eight switches 136 and 137 and so on, connected in said circuit for shifting the phase and the delay/advance control circuit 97 has eight switches 138 and 139, and so on, connected in said circuit for shifting the phase.

The source pulse generator 86 has a plurality of outputs 140, 141, 142, 143 and 144, at which it provides a composite sync (S) output, a composite blanking (BL) output, a burst flag (BF) output, a horizontal drive (HD) output and a vertical drive (VD) output, respectively. The outputs 140 to 144 of the pulse source generator 86 are connected via an amplifier 145 to output terminals 146, 147, 148, 149 and 150, respectively, at which the composite sync (S), the composite blanking (BL), the burst flag (BF), the horizontal drive (HD) and the vertical drive (VD) outputs, respectively, are provided.

A vertical reset logic circuit 151 has a pair of input terminals 152a and 152b to which an output composite sync signal and output vertical drive signal, respectively, are supplied, and an output connected to an input 152c of the source pulse generator 86 to which it supplies a vertical reset signal and to a second input 153 of the sync with burst generator 135. The output 142 of the source pulse generator 86 is connected to a third input 154 of the sync with burst generator 135. The output 144 of the source pulse generator 86 is connected to a first input 156 of a field one identification output 157. The field identification generator 91 has an output connected in common to a second input 158 of the field one identification output 157 and a fourth input 159 of the sync with burst generator 135 and supplies the field identification flag to said inputs. The sync with burst generator 135 has an output connected to an output terminal 160, at which it provides a sync with burst (S/B) signal. The field one identification output 157 has an output connected to an output terminal 161, at which it provides the field identification (FID) signal.

Figure 4:
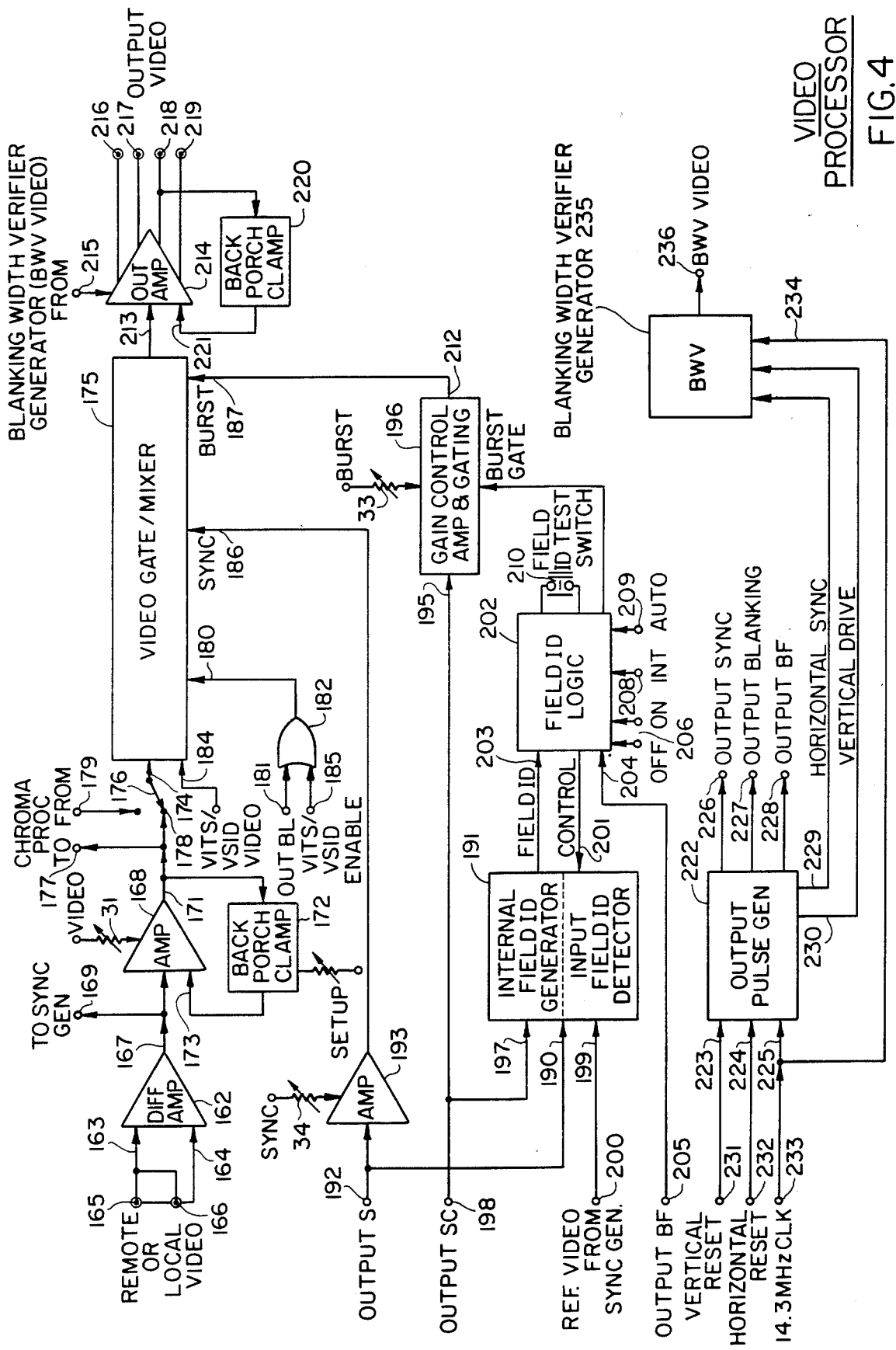
FIG. 4 is a block diagram of an embodiment of the video processor of FIG. 1.

FIG. 4 shows an embodiment of the video processor, or video processing amplifier 2, of the sync generator, video processor of the invention, as shown in FIGS. 1 and 2. The video processor 2 comprises components and circuitry known in the art and commercially available, with the exception of the blanking width verifier generator (BWV) 235. In FIG. 4, a differential amplifier 162 has a pair of inputs 163 and 164, each of which is connected to a pair of input terminals 165 and 166. Remote or local video signals are fed to the input terminals 165 and 166. The differential amplifier 162 has an output 167 connected in common to a first input of an amplifier 168 and an output terminal 169, at which it provides video signals to the sync generator 1. The video level input of the amplifier 168 is controlled via the variable resistor 31 (FIG. 2). The amplifier 168 has an output 171 and a feedback circuit, including a back porch clamp 172, connected between said output and a second input 173.

The output 171 of the amplifier 168 is connected to a first input 174 of a video gate/mixer 175 via a two position switch arm 176 and to an output terminal 177. The switch arm 176 is connected, at one end, to the video gate/mixer 175 and is selectively connected, at its other end, to the output 171 of the amplifier 168, via a terminal 178, or to an input terminal 179. The output terminal 177 and the input terminal 179 are connected to the chroma processor and supply an input to, and derive an output from, said processor, respectively. The chroma processor enables the control of the chroma level independent of any other level of the signal. An output blanking (OUT BL) signal is fed to a second input 180 of the video gate/mixer 175 via an input terminal 181 and an AND gate 182. The video gate/mixer 175 has a third input 184 via which said gate/mixer is supplied with VITS/VSID video enable signals.

VITS/VSID enable signals are supplied to the second input 180 of the video gate/mixer 175 via an input terminal 185 and the AND gate 182. Output sync (OUT S) signals are fed to a fourth input 186 of the video gate/mixer 175 and an input 190 of an internal field identification generator and input field identification detector 191 via an input terminal 192. The input terminal 192 is connected to the input 189 via an amplifier 193. The sync level of the amplifier 193 is controlled via the variable resistor 34 (FIG. 2). An output sub-carrier (OUT SC) is fed in common to a first input 195 of a gain control amplifier and gating circuit 196 and to a second input 197 of the internal field identification generator and input field identification detector 191, via an input terminal 198.

The input field ID detector and the internal field ID generator 191 of FIG. 4 accomplish the primary objects of the invention. The input field ID detector detects the presence of an input color field ID on the incoming video reference. The color field ID is defined as a color burst of 3.58 mHz occurring during the vertical interval and preceding the horizontal sync pulse of line 10 on fields 2 and 3, only. The field ID detector then informs the internal field ID generator to output a field ID on the output video on fields 2 and 3. If there is no field ID present, the internal field ID generator generates a field ID based on the relative phase between the horizontal sync and sub-carrier. The purpose of the field ID is to positively identify the four fields and to set the correct sub-carrier to horizontal (SCH) phase. This is accomplished by the field ID burst being a burst of 3.58 mHz sub-carrier, which is the same sub-carrier that the normal back porch burst is generated from.

A test switch 210 is provided to set he output sub-carrier to horizontal. The test switch 210 puts the field ID burst on every other even line, and extends the burst, which is normally 9 cycles, to 17 cycles. This will not overlay the sub-carrier over the leading edge of the horizontal sync. Every other even line was selected because an even line sub-carrier over the sync provides a positive-going zero crossing over the leading edge of the sync. Every other even line gives the display the illusion of the sub-carrier laid over the sync, since the horizontal sync is displayed in one sweep trace and the sub-carrier added with the sync is displayed in the next sweep.

A reference video signal from the sync generator 1 is fed to a third input 199 of the internal field identification generator and input field identification detector 191 via an input terminal 200. Control signals are fed to a fourth input 201 of the internal field identification generator and input field identification detector 191 from a first output of a field identification logic circuit 202, and the output of said internal field identification generator and input field identification detector 191 is connected to said field identification logic circuit and supplies a field identification signal to a first input 203 thereof. An output burst flag (OUT BF) is fed to a second input 204 of the field identification logic circuit 202 via an input terminal 205.

The field identification logic circuit 202 has a plurality of control inputs 206, 208 and 209 for OFF/ON, internal and automatic operation, respectively. A field identification test switch 210 is connected to the field identification logic circuit 202. The field identification test switch 210 is a momentary switch which returns to its original position and functions to make the field identification logic go into its test mode to enable setting of the correct sub-carrier to horizontal. A second output 211 of the field identification logic circuit 202 is connected to a third input of the gain control amplifier and gating circuit 196 and supplies the burst gate thereto. The gain control amplifier and gating circuit 196 has an output 212 connected to a fifth input 187 of the video gate/mixer 175 and supplies the burst signal thereto.

The output of the video gate/mixer 175 is connected to a first input 213 of an output amplifier 214. A blanking width verifier generator 235 supplies a blanking width verifier (BWV) video signal to the amplifier 214 via an input terminal 215. The amplifier 214 has a plurality of output terminals 216, 217, 218 and 219, at which it provides output video. A back porch clamp 220 is connected in a feedback circuit between the output 218 of the amplifier 214 and an input 221 thereof, and functions to maintain the output DC.

An output pulse generator 222 (FIG. 4) has a plurality of inputs 223, 224 and 225 and a plurality of outputs 226, 227, 228, 229 and 230. A vertical reset signal is supplied to the input 223 of the generator 222 via an input terminal 231. A horizontal reset signal is supplied to the input 224 of the generator 222 via an input terminal 232. A 14.3 mHz clock pulse is supplied in common to the input 225 of the output pulse generator 222 and a first input 234 of a blanking width verifier generator 235. The output 229 of the generator 222 is connected to a second input of the blanking width verifier generator 235 and feeds horizontal sync signals to said blanking width verifier generator via said input. The output 230 of the generator 222 is connected to a third input of the blanking width verifier generator 235 and feeds vertical drive signals to said blanking width verifier generator. The blanking width verifier 235 has an output 236 at which it provides the blanking width verification (BWV) video signal which is fed to the input 215 of the amplifier 214.

The primary objects are also accomplished by the automatic sub-carrier to horizontal (SCH) phase circuit 71, shown in FIGS. 4 and 5. The automatic sub-carrier to horizontal phase circuit 71 maintains the output sub-carrier to horizontal phase once it has been set. The object of the circuit 71 is to track the sync with the sub-carrier. Clocking the horizontal sync with two times the sub-carrier may accomplish this object, but causes an interchange of the field sequecnce. The solution is to clock half the horizontal sync with the sub-carrier. This will not cause an interchange of fields. In order to prevent an output horizontal jitter, resulting from the leading edge of the horizontal sync being in time coincidence with the leading or clocking edge of the sub-carrier, a specific amount of hysteresis is added. This hysteresis prevents the leading edge of the horizontal sync from being in time coincidence with the leading edge of the sub-carrier. By sensing the phase differential between half the horizontal sync and the sub-carrier, an input delay of the horizontal sync is switched ON or OFF, depending upon the phase differential.

FIG. 5 shows an embodiment of an automatic sub-carrier to horizontal phase circuit for the sync generator, video processor of the invention. All the components of the circuit of FIG. 5 are known in the art and commercially available. The circuit of FIG. 5 comprises a PNP input transistor 237 having an emitter electrode connected to a positive voltage source via an input terminal 238, a collector electrode connected to a monostable multivibrator 240 via a connector 239 and a resistor 241 and to said monostable multivibrator via a connector 242, a capacitor 243 and said resistor. An input horizontal sync signal is fed to the input 244 of the monostable multivibrator 240 via an input terminal 245.

The transistor 237 has a base electrode connected to the output 246 of a toggle flip-flop 247 via a resistor 248. A positive voltage is applied to the base electrode of the transistor 237 via an input terminal 249 and a resistor 250 and is applied to the connector 239 of the multivibrator 240 via an input terminal 251 and a resistor 252. The resistors 241 and 252 and the capacitor 243 are timing components. An AND gate 253 has a first input 254 via which the inverted sub-carrier is fed thereinto and a second input 255 via which twice the sub-carrier is fed thereinto. The AND gate 253 has an output connected to the set input 256 of data (D) flip-flop 257. The data flip-flop 257 has an output connected to the input 258 of the flip-flop 247.

The input field identification signal is fed to a first input 259 of a toggle flip-flop 260 via an input terminal 261. The output of the monostable multivibrator 240 is connected to a second input 262 of the flip-flop 260 and supplies delayed horizontal sync signals to said multivibrator. The toggle flip-flop 260 has an output connected in common to the clock input 263 of the data flip-flop 257 and the set input 264 of a data flip-flop 265 and supplies the horizontal sync signals divided by 2 to said inputs. The sub-carrier is fed to the clock input 266 of the data flip-flop 265 via an input terminal 267. The output of the data flip-flop 265 is the horizontal sync signal divided by 2 and is provided at an output terminal 268.

In operation of the circuit of FIG. 5, an input horizontal sync signal, applied to the monostable multivibrator 240 via the input terminal 245, triggers said monostable multivibrator. When the monostable multivibrator 240 is triggered, it produces a short positive-going pulse at its output which is applied to the toggle flip-flop 260. The duration of the pulse is dependent upon the timing components 241, 252 and 243. An input field ID signal at the input terminal 261 resets the toggle flip-flop 260. The trailing edge of the horizontal delayed signal from the monostable multivibrator 240 triggers or toggles the flip-flop 260, which causes said flip-flop to change states at its output and results in the production of a signal which is applied to the data input of the data flip-flop 265. The data flip-flop 260 halves the frequency, so that the output signal is divided by 2.

The data input of the flip-flop 265 is fed in. The leading edge of the sub-carrier clocks the flip-flop 265 so that it clocks out data present at the input terminal 264 and provides a halved frequency at the output terminal 268. The horizontal sync signal is then in step with the sub-carrier. The feedback path is used to prevent jitter in the horizontal output caused by the horizontal sync and sub-carrier being in time coincidence at the inputs of the data flip-flop 265. The feedback loop provides a hysteresis effect on the incoming horizontal sync.

The signal output of the flip-flop 260 is applied to the clock input 263 of the data flip-flop 257. An inverted sub-carrier is applied to the input 254 of the AND gate 253 and twice the sub-carrier is applied to the input 255 of said AND gate, so that said AND gate conducts the combined signals to the data input of the data flip-flop 257. The data flip-flop 257 provides the data input at its input 256 to the toggle input 258 of the toggle flip-flop 247. This toggles the flip-flop 247, so that it produces an output signal which controls the conductivity of the transistor 237, which, in turn, controls the delay of the monostable multivibrator 240.

Hysteresis is provided, since the data flip-flop 257 is actually a phase comparator which is continually comparing the horizontal and sub-carrier phase. Whenever the leading edge of the horizontal sync falls on the leading edge of the sub-carrier, an output is provided by the data flip-flop 257, which, in turn, toggles the toggle flip-flop 247. The output of the flip-flop 247 thus turns the transistor 237 ON or OFF, depending on which state it was in before. This, in turn, changes the delay in the monostable multivibrator 240. This change in delay moves the leading edge of the horizontal sync off the leading edge of the sub-carrier.

Figure 6:
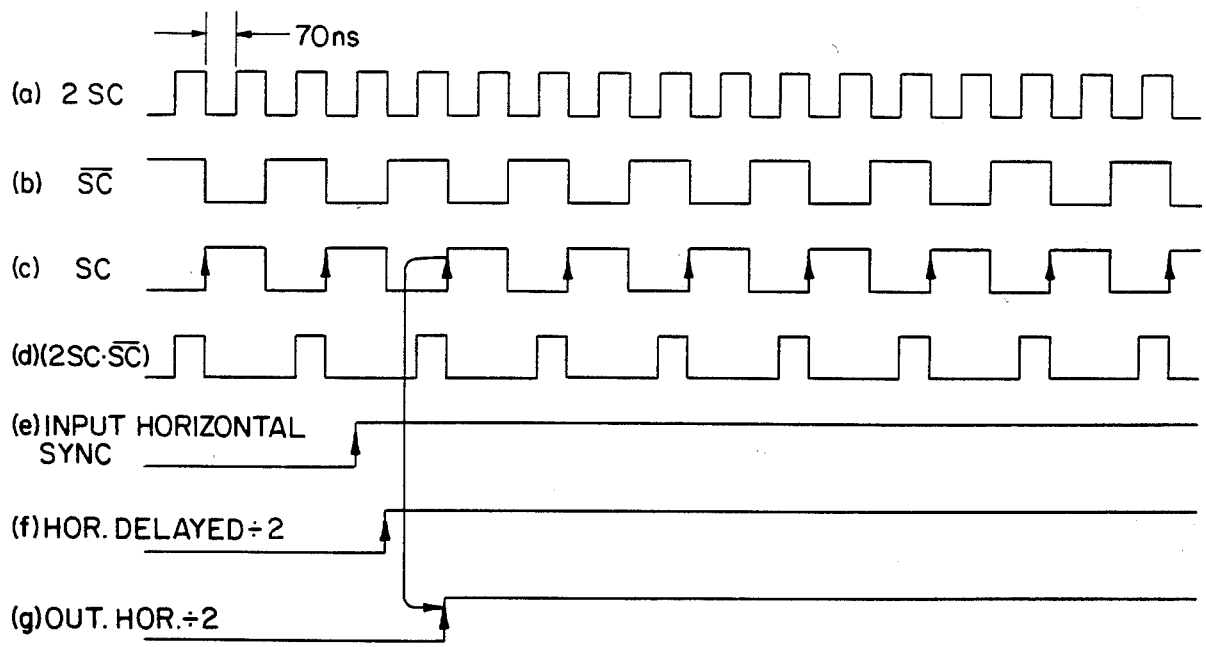
FIG. 6 is a graphical presentation of the operation of the circuit of FIG. 5, showing the signals at various points of said circuit.

FIG. 6 shows the signals at various points of the circuit of FIG. 5. In FIG. 6, (a) is twice the sub-carrier supplied to the input terminal 255, (b) is the inverted sub-carrier supplied to the input terminal 254, (c) is the sub-carrier supplied to the input terminal 267 and (d) is the product of the pulses of (a) and (b), or twice the sub-carrier times the inverted sub-carrier. In FIG. 6, (e) is the horizontal sync input signal provided at the input terminal 245, (f) is the delayed horizontal sync signal divided by 2, provided at the output of the monostable multivibrator 240 and supplied to the input 262 of the toggle flip-flop 260 and (g) is the output horizontal sync signals divided by 2, provided at the output of said flip-flop 260 and the output terminal 268.

If the delayed horizontal sync signal falls within the window of the pulse 6(d), which is twice the sub-carrier times the inverted sub-carrier, the delay is either switched ON or OFF, depending upon the state of the toggle flip-flop 247 of FIG. 5.

Figure 7:
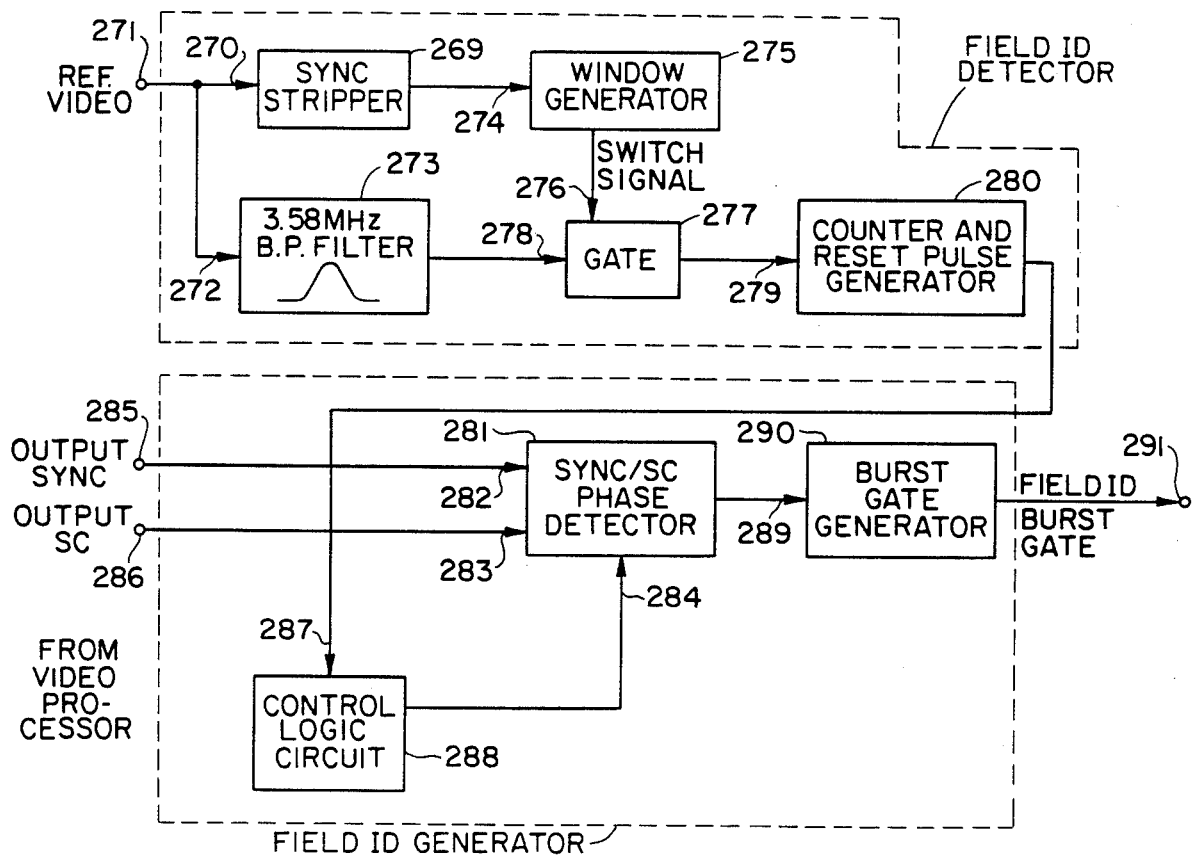
FIG. 7 is a block diagram of an embodiment of the field ID detector and generator of FIGS. 3 and 4.

FIG. 7 shows an embodiment of the field identification detector and generator of FIGS. 3 and 4. In FIG. 7, the field identification detector comprises a sync stripper 269 having an input 270 to which a reference video signal is supplied via an input terminal 271. The reference video signal is supplied in common to the input 270 of the sync stripper 269 and the input 272 of a 3.58 mHz bandpass filter 273. The output of the sync stripper 269 is connected to the input 274 of a window generator 275 and the output of said window generator is connected to a first input 276 of a gate circuit 277 and supplies a switch signal thereto. The output of the filter 273 is connected to a second input 278 of the gate circuit 277. The output of the gate circuit 277 is connected to the input 279 of a counter and reset pulse generator 280.

In FIG. 7, the field identification generator comprises a sync/sub-carrier phase detector 281 having first, second and third inputs 282, 283 and 284, respectively. An output sync signal from the video processor 2 is fed to the first input 282 of the sync/sub-carrier phase detector 281 via an input terminal 285 and an output sub-carrier from said video processor is fed to the second input 283 of said phase detector via an input terminal 286. The output of the counter and reset pulse generator 280 is connected to the input 287 of a control logic circuit 288. The output of the control logic circuit 288 is connected to the third input 284 of the sync/sub-carrier phase detector 281. The output of the sync/sub-carrier phase detector 281 is connected to the input 289 of a burst gate generator 290. The output of the burst gate generator 290 is connected to an output terminal 291 at which it provides the field identification burst gate signal.

In operation of the circuit of FIG. 7, a reference video signal is applied to the sync stripper 269 and the bandpass filter 273 via the input terminal 271. The sync stripper 269 separates the composite sync information from the input reference video and supplies the composite sync information to the input of the window generator 275. The window generator 275 generates the switch signal which turns the gate 277 ON or OFF. The window is placed where field ID is normally located on the incoming video; that is, on the front porch of the line 10. The bandpass filter extracts the chrominance information from the incoming video, of which the field ID burst is part. The output of the gate 277 contains only the field ID information. The generator 280 determines if it is a valid field ID and accordingly outputs reset pulses to the control logic circuit 288 of the field ID generator. This enables the output field ID to be in step with the input field ID.

The field ID generator has two modes of operation: internal and external. When in its internal mode, the field ID generator generates a field ID based upon the relative phase between the output sync and output sub-carrier. This is done in the sync/sub-carrier phase detector 281, which makes that decision. The phase detector 281 provides output signals to the burst gate generator 290 which generates the field ID in proper fields, based upon the relative phase between the output sync and the output sub-carrier. When in the external mode of operation, the control logic circuit 288 determines, via the phase detector 281, in which fields the field ID burst will be added or inserted.

Additional circuit functions which enhance the operation of the sync generator, video processor of the invention, as hereinbefore described, are the VITS/VIRS insertion, the blanking width verification, the video source identification and the digital remote control (FIG. 4). The VITS/VIRS inserter 175 inserts a VITS signal on line 18, fields 1 and 2, for inline testing of the video signal path. It may also insert a VIRS signal on line 19, fields 1 and 2, for use in AGC amplifiers, and the like. The blanking width verifier generator 235 provides a visual indication of the horizontal and vertical blanking width, or more precisely, if they are within FCC tolerances. The blanking width verifier generator 235 puts a white dashed line border at the edges of the legal picture area, centered at the FCC's nominal values for blanking width. The markers of the border are fixed in time and width and are related to the horizontal and vertical sync. The video source identification (VSID) generator provides a unique nine character identification to be inserted into the active video field for identifying the source of the video. This feature is enabled remotely. The digital remote control permits the remoting of the front panel level and phase controls.

Figure 8:
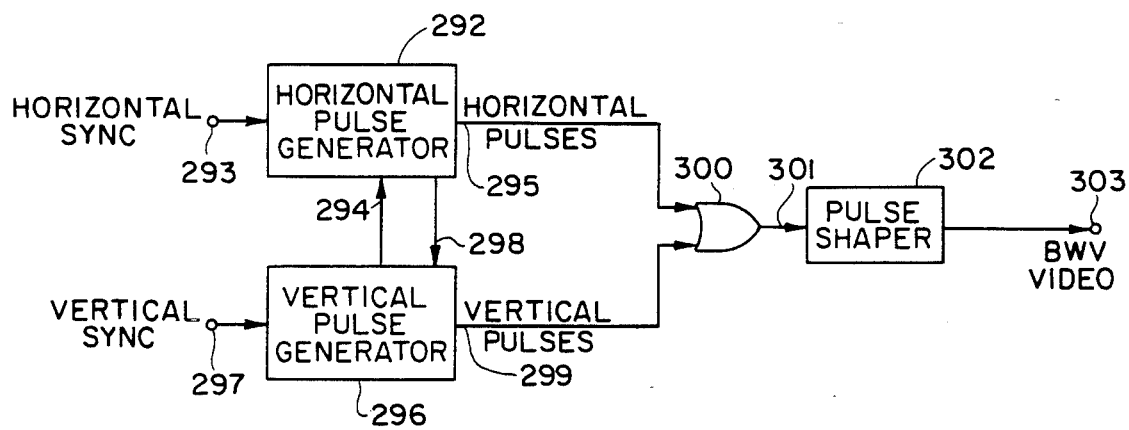
FIG. 8 is a block diagram of an embodiment of the blanking width verifier generator of FIG. 4.

FIG. 8 is a block diagram of an embodiment of the blanking width verifier generator 235 of the video processor (FIG. 4). The blanking width verifier generator of FIG. 8 comprises a horizontal pulse generator 292 having a first input to which the horizontal sync is fed via an input terminal 293 and a second input 294. The horizontal pulse generator 292 has a first output 295 at which it provides horizontal pulses. A vertical pulse generator 296 has a first input to which the vertical sync is fed via an input terminal 297 and a second input 298. The vertical pulse generator 296 has a first output 299 at which it provides vertical pulses. The horizontal pulse generator 292 has a second output connected to the second input 298 of the vertical pulse generator 296 and said vertical pulse generator has a second output connected to the second input 294 of said horizontal pulse generator.

The first outputs 295 and 299 of the horizontal and vertical pulse generators 292 and 296, respectively, are connected to the first and second inputs, respectively, of an AND gate 300. The AND gate 300 has an output connected to the input 301 of a pulse shaper 302. The pulse shaper 302 has an output connected to an output terminal 303 at which blanking width verified video signals are provided.

Figure 9:
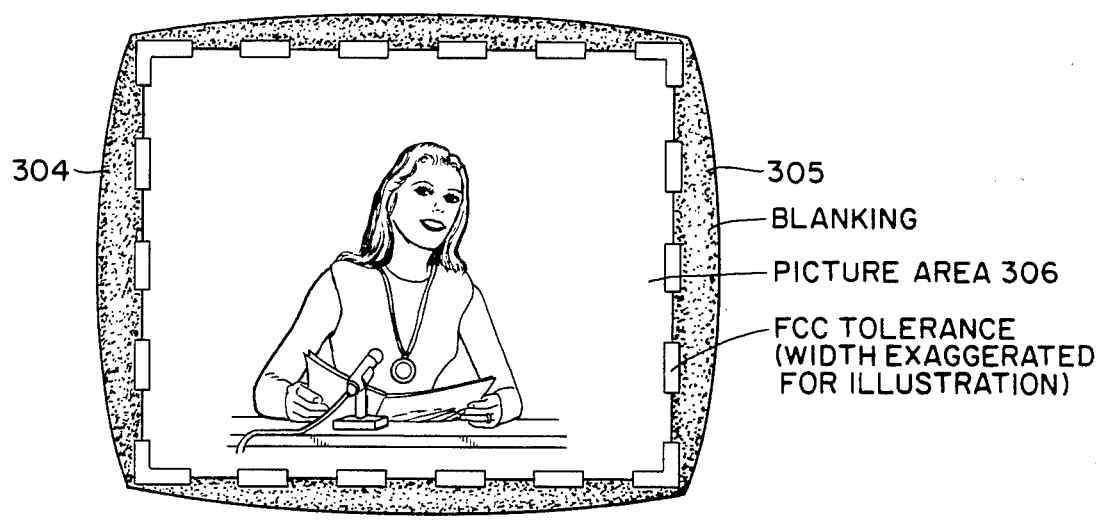
FIG. 9 is an illustration of the blanking width pulses displayed on a picture monitor.

The blanking width verifier of FIG. 8 provides a rapid and efficient means for measuring or determining if the horizontal and/or vertical blanking is within tolerance. FIG. 9 illustrates the blanking width pulses displayed on a picture monitor. The width of the pulses on each side 304 and 305 of the picture area 306 depict the normal width for horizontal blanking. If the picture is inside the markers, the horizontal blanking is too wide and if it is outside the markers, the horizontal blanking is too narrow. The pulses at the top and bottom of the picture indicate the permissible vertical blanking. If the picture is outside the markers, the vertical blanking is too narrow and if it is inside the markers, the vertical blanking is too wide.

Figure 10:
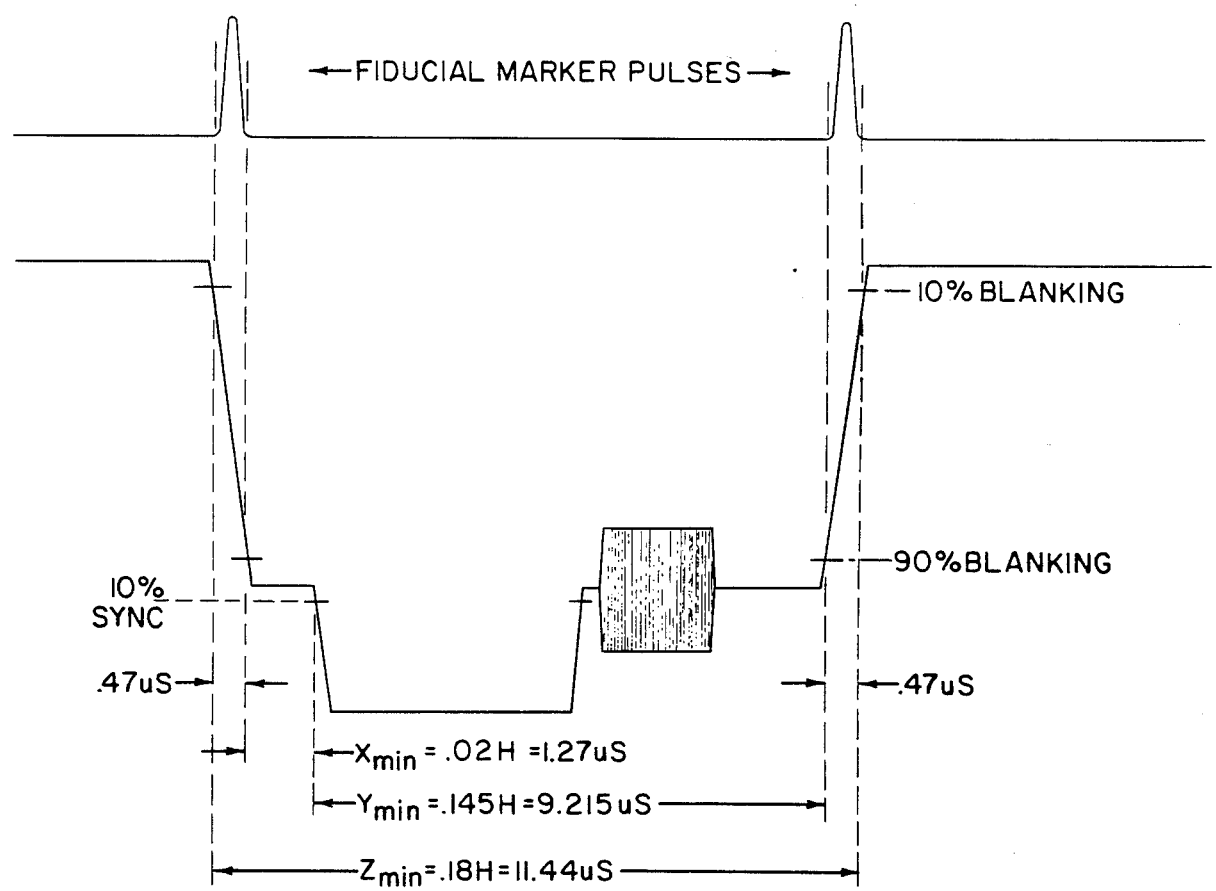
FIG. 10 is a graphical presentation of the horizontal blanking width markers produced by the horizontal pulse generator of FIG. 8.

The horizontal pulse generator 292 of the blanking width verifier of FIG. 8 generates the pulses or markers which indicate the permissible horizontal blanking, as shown in FIG. 10. The horizontal blanking pulses are derived from a high frequency clock of 14.3 mHz phase locked to the horizontal sync and digitally counted down. This assures a precise timing relationship between the pulses and the horizontal sync. The pulses are serrated in FIG. 10, so that the edge of blanking may be seen between the pulses.

The vertical pulse generator 296 of the blanking width verifier of FIG. 8 generates the pulses or markers which indicate the permissible vertical blanking. These pulses are generated in much the same manner as the horizontal pulses, utilizing the horizontal sync instead of the high frequency clock. Both the horizontal and vertical pulse generators 292 and 296, respectively, output their pulses through the pulse shaper 302 (FIG. 8), which gives such pulses an approximate rise time of a 250 ns 2T pulse and gives the horizontal pulses an approximate duration of a 250 ns 2T pulse. The BWV video output is linearly added to the video signal.

Figure 11:
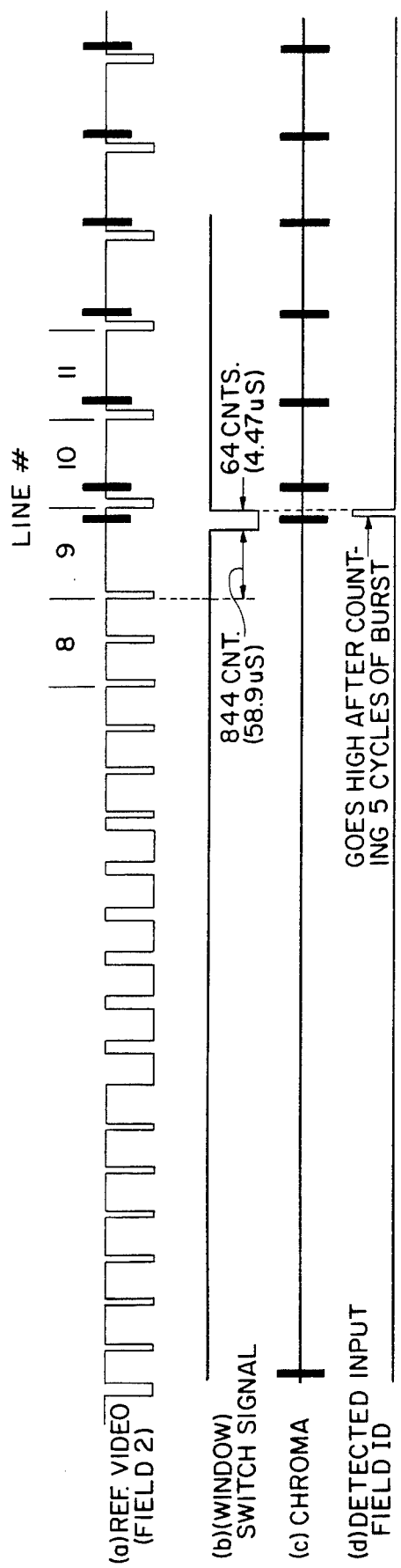
FIG. 11 is a graphical presentation of the operation of the circuit of FIG. 7, showing the signals at various points of said circuit.

FIG. 11 shows the signal at various points of the circuit of FIG. 7. In FIG. 11, (a) is the reference video supplied to the input terminal 271, (b) is the window switch signal produced by the window generator 275 and supplied to the input 276 of the gate 277, (c) is the chroma and (d) is the detected input field ID provided by the burst gate generator 290 at the output terminal 291.

Although shown and described in what are believed to be the most practical and preferred embodiments, it is apparent that departures from the specific methods and designs described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

I claim:

1. In a color video system, a sync generator video processor comprising
    a single compact multi-function video processing unit including a sync generator for driving a video source, said sync generator having horizontal and sub-carrier phasing control means;
    a video processor for providing video functions, said video processor including color field identifications, blanking width verification and output equalization;
    a power supply;
    a front panel control;
    a rear panel; and
    a bus system interconnecting said sync generator and said video processor, said bus system including a power bus connecting said power supply to said sync generator and to said video processor, a control bus connecting said sync generator and said video processor to said front panel control, an input/output bus connecting said sync generator and said video processor to said rear panel and an interconnect bus interconnecting said sync generator and said video processor.

2. In a color video system as claimed in claim 1, wherein said video processor includes an input for receiving a video reference and a field identification detector and a field identification generator for detecting the presence of an input color field identification on the incoming video reference, said color field identification being a color burst of a predetermined frequency occurring during the vertical interval and preceding a horizontal sync pulse of line 10 on fields 2 and 3 only, said field identification detector informing said field identification generator to output a field identification on the output video on fields 2 and 3, said field identification generator generating a field identification based on the relative phase between the horizontal sync and a sub-carrier in the absence of a field identification, said field identification positively identifying the four fields and setting the correct sub-carrier to horizontal phase.

3. In a color video system as claimed in claim 2, wherein said field identification detector comprises a sync stripper for receiving said video reference, a bandpass filter for passing said predetermined frequecncy and extracting the chrominance information from the incoming video, said bandpass filter having an input connected with said sync stripper in common to said input for receiving said video reference, a gate having first and second inputs and an output, a window generator having an input connected to said sync stripper and an output connected to the first input of said gate and supplying a switch signal thereto for selectively turning said gate ON and OFF, said filter having an output connected to said second input of said gate, the output of said gate containing only field identification information, and a counter and reset pulse generator connected to the output of said gate for providing reset pulses.

4. In a color video system as claimed in claim 3, wherein said field identification generator has internal and external modes of operation and comprises a control logic circuit connected to the counter and reset pulse generator of said field identification detector whereby said control logic circuit receives said reset pulses thereby enabling the output field identification to be in step with the input field identification, a sync/sub-carrier phase detector connected to said control logic circuit and receiving an output sync and an output sub-carrier from said video processor, said phase detector determining the relative phase between said output sync and output sub-carrier, and a burst gate generator connected to said phase detector for generating the field identification in proper fields based upon the relative phase between said output sync and output sub-carrier, in the internal mode of operation of said field identification generator.

5. In a color video system as claimed in claim 4, wherein, in the external mode of operation of said field identification generator, said control logic circuit determines, via said phase detector, in which fields the field identification burst will be added.

6. In a color video system as claimed in claim 1, wherein said video processor includes a blanking width verifier for providing a rapid and efficient means for determining and measuring if horizontal and vertical blanking is within tolerance, said blanking width verifier comprising a horizontal pulse generator for generating pulses which indicate the permissible horizontal blanking, said horizontal pulse generator having a horizontal sync first input, a second input and first and second outputs, a vertical pulse generator for generating pulses which indicate the permissible vertical blanking, said vertical pulse generator having a vertical sync first input, a second input and first and second outputs, the first output of said horizontal pulse generator being connected to the second input of said vertical pulse generator, the first output of said vertical pulse generator being connected to the second input of said horizontal pulse generator, a gate and a pulse shaper connected to the second outputs of said horizontal pulse and vertical pulse generators via said gate and providing blanking width verified video signals.

7. In a color video system as claimed in claim 1, wherein said sync generator, video processor further includes an option board having a video source identification circuit for generating characters in the video to provide a source identification, a vertical interval test signal/vertical interval reference signal generator for generating the vertical interval test and vertical interval reference signals, inserted during black intervals, and a digital remote circuit for enabling the use of switches for logic control on said board, said power bus connects said power supply to said option board, said control bus connects said option board to said front panel control, said input/output bus connects said option board to said rear panel and said interconnect bus interconnects said sync generator, video processor and option board.

8. In a color video system as claimed in claim 7, wherein said video processor has an input for feeding it video from a local video source, a plurality of inputs connected to corresponding outputs of said sync generator for receiving horizontal reset, vertical reset and clock pulses from said sync generator, video level control means, setup level control means, burst level control means, sync level control means and chroma level control means, a plurality of video outputs, and a pair of outputs for feeding a sync signal and a sub-carrier to said option board.

9. In a color video system as claimed in claim 7, wherein said sync generator includes a sub-carrier to horizontal phase circuit for maintaining the sub-carrier to horizontal phase automatically, regardless of input, said sub-carrier to horizontal phase circuit having an input providing a horizontal sync and inputs providing a sub-carrier thereto and clocking half said horizontal sync with said sub-carrier in order to track said sync with said sub-carrier thereby preventing an interchange of fields.

10. In a color video system as claimed in claim 9, wherein said sub-carrier to horizontal phase circuit of said sync generator further includes hysteresis adding means for adding a specific amount of hysteresis in order to prevent output horizontal jitter resulting from the leading edge of said horizontal sync being in time coincidence with the leading edge of said sub-carrier, said hysteresis adding means preventing said leading edge of said sync from being in time coincidence with said leading edge of said sub-carrier.

11. In a color video system as claimed in claim 10, wherein said sub-carrier to horizontal phase circuit of said sync generator further includes an input delay and switch means for sensing the phase differential between half said horizontal sync and said sub-carrier and switching said input delay of said horizontal sync ON and OFF in accordance with said phase differential.

12. In a color video system as claimed in claim 1, wherein said sync generator has a plurality of reference inputs for feeding primary signals, secondary signals and a sub-carrier to said sync generator, source horizontal phase control means, output horizontal phase control means, system phase control means, output sub-carrier phase control means and source sub-carrier control means, and a plurality of outputs for feeding a composite sync, a composite blanking signal, a burst flag drive signal, a horizontal drive signal, a vertical drive system, a source/burst signal, a field identification signal and a sub-carrier to a local video source.

* * * * *